United States Patent [19]

Okamura et al.

[11] Patent Number: 4,668,414

[45] Date of Patent: May 26, 1987

[54] PROCESS FOR PRODUCING ACICULAR PARTICLES CONTAINING AN IRON CARBIDE

[75] Inventors: Kazuo Okamura, Itami; Ikuo Kitamura, Kyoto; Hideki Aomi; Satoshi Koyama, both of Osaka; Katsushi Tokunaga, Habikino, all of Japan

[73] Assignee: Daikin Industries Ltd., Osaka, Japan

[21] Appl. No.: 790,178

[22] Filed: Oct. 22, 1985

[30] Foreign Application Priority Data

Oct. 25, 1984 [JP] Japan .............................. 59-224966

[51] Int. Cl.$^4$ ...................... C01B 31/30; C04B 35/56
[52] U.S. Cl. ............................. 252/62.51; 252/62.56; 423/439
[58] Field of Search .................... 423/439; 252/62.56, 252/62.51

[56] References Cited

U.S. PATENT DOCUMENTS

| | | | |
|---|---|---|---|
| 2,535,042 | 12/1950 | Cohn et al. | 423/439 |
| 3,572,993 | 3/1971 | Rogers | 423/439 |
| 3,885,023 | 5/1975 | Gray et al. | 423/439 |
| 4,033,891 | 7/1977 | Matsui et al. | 252/62.56 |
| 4,213,959 | 7/1980 | Brodt et al. | 252/62.56 X |
| 4,367,214 | 1/1983 | Sarnecki et al. | 252/62.56 X |

OTHER PUBLICATIONS

Beaulieu et al., "Canadian Metallurgical Quarterly", vol. 12, No. 3, (1973), p. 265.

*Primary Examiner*—Jack Cooper
*Attorney, Agent, or Firm*—Murray and Whisenhunt

[57] ABSTRACT

A process for producing acicular particles containing an iron carbide which comprises, (a) contacting or not contacting acicular oxyhydroxide or acicular iron oxide with a reducing agent containing no carbon atom and, (b) contacting the iron compound of the above (a) with a reducing-and-carbonizing agent containing carbon atom or a mixture thereof with a reducing agent containing no carbon atom, (provided that CO is excluded from the reducing-and-carbonizing agent of (b) when the contact in (a) is not conducted).

14 Claims, No Drawings

PROCESS FOR PRODUCING ACICULAR PARTICLES CONTAINING AN IRON CARBIDE

The invention relates to a process for producing acicular particles containing an iron carbide.

The applicant has filed patent applications based on the finding that acicular particles containing iron carbide are produced by contacting acicular iron oxyhydroxide or acicular iron oxide with CO or a mixture of CO and $H_2$ at 250° to 400° C., and that these particles are chemically stable, have high coercive force and are useful for a magnetic material of the magnetic recording medium (Japanese patent application Nos. 171765/1983, 217530/1983, 236753/1983 and 10400/1984). In these applications, however, there arises problems in the use of harmful CO as an essential starting material and the deposition of free carbon on the resulting acicular particles. Thus, further investigation was conducted.

With checking of weight variation and differential thermal analysis of the starting iron compound during the heating in a stream of CO, we have found that the iron compound is first reduced to a compound having a lower oxidation degree and then carbonization thereof occurs and gradually become predominant.

An object of the invention is to provide a process for producing acicular particles containing an iron carbide without or with use of CO in a reduced amount.

The above and other objects of the invention will be apparent from the following description.

The present invention provide a process for producing acicular particles containing an iron carbide which comprises, (a) contacting or not contacting acicular oxyhydroxide or acicular iron oxide with a reducing agent containing no carbon atom and, (b) contacting the iron compound of the above (a) with a reducing-and-carbonizing agent containing carbon atom or a mixture thereof with a reducing agent containing no carbon atom, (provided that CO is excluded from the reducing-and-carbonizing agent of (b) when the contact in (a) is not conducted).

Examples of preferred acicular iron oxyhydroxides are acicular α-FeOOH (goethite), acicular β-FeOOH (akaganite) and acicular γ-FeOOH (lepidocrosite). Examples of preferred acicular iron oxides are acicular α-$Fe_2O_3$ (hematite), acicular γ-$Fe_2O_3$ (maghemite) and acicular $Fe_3O_4$ (magnetite). Acicular β-FeOOH is preferably treated with an aqueous solution of alkaline compound.

Acicular α-$Fe_2O_3$ or acicular γ-$Fe_2O_3$ is, for example, any of one prepared by heating acicular α-FeOOH, acicular β-FeOOH or acicular γ-FeOOH at about 200° to about 350° C., followed by dehydration, acicular α-$Fe_2O_3$ or acicular γ-$Fe_2O_3$ prepared by heating the resulting product further at about 350° to about 900° C. to compact the crystals, and others.

The above-mentioned acicular $Fe_3O_4$ can be prepared by contacting an acicular iron oxide other than acicular $Fe_3O_4$ or acicular iron oxyhydroxide with a reducing-and-carbonizing agent containing carbon atom or a reducing agent containing no carbon atom, or a mixture thereof, although the $Fe_3O_4$ is not limited to one prepared in those methods. When a reducing-and-carbonizing agent containing carbon atom or a mixture thereof with a reducing agent containing no carbon atom, is contacted with an acicular iron oxyhydroxide or acicular iron oxide other than acicular $Fe_3O_4$ to prepare acicular $Fe_3O_4$, the same contact conditions as those in the process of the invention can also be employed except for the time condition. In thise case, the acicular $Fe_3O_4$ formed can be subsequently held in contact with the gas under the same conditions as in the preceding reaction without any interruption to obtain the desired acicular particulate material of the invention.

The starting acicular iron oxyhydroxides or acicular iron oxides can be those usually at least 3, preferably 3 to 20, in average axial ratio and having an average particle size (long axis) of usually up to 2 μm, preferably 0.1 to 2 μm, most preferably 0.1 to 1.0 μm. As will be described later, the acicular particles produced are slightly smaller than, but almost unchanged from, the starting material in average axial ratio and in average particle size, so that the acicular particles of the invention in general preferably have such sizes as already stated.

The starting material to be used for the process for producing acicular particles according to the invention may have added thereto a small amount or small amounts of a compound, such as oxide or carbonate of copper, magnesium, manganese or nickel, silicon oxide, potassium salt, sodium salt, etc., insofar as the starting material is acicular and chiefly comprises an iron oxyhydroxide or iron oxide.

The starting acicular iron oxyhydroxide preferably has a pH of at least 5 on the surface thereof as disclosed in Japanese patent application No. 217,530/1983. In this case are produced acicular particles having a higher coercive force. The starting iron oxyhydroxide having a pH of less than 5 can be used after it is increased to at least 5 in pH by contact with an aqueous solution of an alkali compound (eg, sodium hydroxide, potassium hydroxide, ammonium hydroxide). Further, alkali-treated acicular iron oxide can also be used. The starting material can be treated with an alkaline compound by contacting the material with an aqueous solution of sodium hydroxide, potassium hydroxide, ammonium hydroxide and like alkaline compound (eg, with an aqueous solution having a pH of at least 8, preferably at least 10), stirring for 30 minutes to 1 hour when required, filtering and drying the mixture.

Acicular iron oxyhydroxide or iron oxide can be coated with a cobalt compound, for example, by dispersing the iron compound in an aqueous solution of a cobalt salt (eg. dilute solution of 0.1 to 10% by weight) with stirring at room temperature or with heating, render the dispersion to alkaline with addition of an aqueous solution of an alkaline compound, stirring for 30 minutes to 1 hour when required, filtering and drying the dispersion.

The starting iron compound can be used as coated with a sintering-preventing agent as disclosed in Japanese patent application No. 250,163/1983. Examples of useful agents are silicone compound, boron compound, aluminum compound, aliphatic carboxylic acid or salt thereof, phosphorus compound, titanium compound, etc.

In the invention, typical examples of the reducing agent containing no carbon atom are $H_2$, $NH_2NH_2$, etc.

As the reducing-and-carbonizing agent, at least one of the following compounds can be used.

① CO

② aliphatic, linear or cyclic, saturated or unsaturated hydrocarbons such as methane, propane, butane, cyclohexane, methylcyclohexane, acetylene, ethylene, propylene, butadiene, isoprene, town gas, etc.

③ aromatic hydrocarbons such as benzene, toluene, xylene, alkylated or alkenylated derivatives thereof having a boiling point up to 150° C.

④ aliphatic alcohols such as methanol, ethanol, propanol, cyclohexanol, etc.

⑤ esters such as methyl formate, ethyl acetate and like ester having a boiling point up to 150° C.

⑥ ethers such as lower alkyl ether, vinyl ether and like ether having a boiling point up to 150° C.

⑦ aldehydes such as formaldehyde, acetaldehyde and like aldehyde having a boiling point up to 150° C.

⑧ ketones such as acetone, methyl ethyl ketone, methyl isobutyl ketone and like ketone having a boiling point up to 150° C.

Particularly preferable reducing-and-carbonizing agent containing carbon atom other than CO are $CH_3OH$, $HCOOCH_3$, saturated or unsaturated aliphatic hydrocarbons having 1 to 5 carbon atoms.

In the invention, the above-mentioned various reducing-and-carbonizing agents containing carbon atom can be used. However, CO is excluded from the reducing-and-carbonizing agent containing carbon atom of (b) when the reducing agent containing no carbon atom is not contacted with the starting iron compound in (a). This means the sole use of CO is excluded but the conjoint use of CO and the reducing-and-carbonizing agent other than CO is not excluded.

In the process (a) of the invention, the reducing agent containing no carbon atom can be used as it is or as diluted. Examples of diluents are $N_2$, argon, helium, etc. The dilution ratio is suitably selected but is preferably about 1.1 to about 10 times (by volume). The contact temperature, contact time, gas flow rate and other conditions depend, for example, on the production history, average axial ratio, average particle size and specific surface area of the acicular iron oxyhydroxide or acicular iron oxide. The preferred contact temperature is about 200° to about 700° C., preferably about 300° to about 400° C. The preferred contact time is about 0.5 to about 6 hours. The preferred gas flow rate (excluding diluent) is about 1 to about 1000 ml S.T.P./min, more preferably about 5 to about 500 ml S.T.P./min, per gram of the starting material. The contact pressure inclusive of that of the diluent is usually 1 to 2 atom. although not limitative particularly.

In the process (b) of the invention, the reducing-and-carbonizing agent containing carbon atom or a mixture thereof with the reducing agent containing no carbon atom can be used as it is or as diluted. When the mixture is used, the mixing ratio of the reducing-and-carbonizing agent and the reducing agent is suitably selected but is preferably 1/0.05 to 1/5 by volume. Contact conditions are also suitably selected but the preferred contact temperature is about 250° to about 400° C., more preferably about 300° to about 400° C. The preferred contact time is about 0.5 to 6 hours when the contact in (a) is conducted, and about 1 to about 12 hours when the contact in (a) is not conducted. The preferred gas flow rate (excluding diluent) is about 1 to about 1000 ml S.T.P./min, more preferably about 5 to about 500 ml S.T.P./ml, per gram of the starting iron compound. The contact pressure inclusive of that of the diluent is usually 1 to 2 atom. although not limitative particularly.

The particulate material obtained by the present process are in the form of generally uniform acicular particles when observed under an electron microscope. The particles are present as primary particles and have the same acicular particulate form as the starting particles of acicular iron oxyhydroxide or acicular iron oxide. The acicular particles obtained by the process are found to contain carbon by elementary analysis and to contain an iron carbide by its X-ray diffraction pattern, which exhibits plane spacings at 2.28 Å, 2.20 Å, 2.08 Å, 2.05 Å and 1.92 Å. Such pattern corresponds to $Fe_5C_2$. The iron carbide component of the present material chiefly comprises $Fe_5CH_2$, with $Fe_2C$, $Fe_{20}C_9$ ($Fe_{2.2}C$), $Fe_3C$, etc. present conjointly therewith in some cases. It is suitable to represent the iron carbide as $Fe_xC$ ($2 \leq x < 3$).

In the event of incomplete carbonization, the acicular particles obtained by the present process further contain an iron oxide component which is chiefly $Fe_3O_4$. With respect to iron oxides, $FeO$, $Fe_3O_4$ and $\gamma$-$Fe_2O_3$ are generally related to one another in structure. The oxygen atoms in these three oxides are packed in a three-dimensional structure to the highest possible density, and the number of oxygen atoms in $Fe_3O_4$ actually present varies in an overall range covering the numbers of oxygen atoms in these oxides, so that it is suitable to represent the iron oxide in the acicular particles by $FeO_y$ ($1 < y \leq 1.5$).

While the acicular particles prepared by the present process contain iron oxide in addition to the iron carbide component in most cases, the elementary analysis values of C, H and N indicate that the amount of carbon is usually excess of that calculated from the chemical formula of the iron carbide identified by the X-ray diffraction pattern. It is not clear whether the excess of carbon is present as combined with iron or as free carbon. In this sense, it is probable that the acicular particles obtained by the present process contain elemental carbon. The particles obtained by the present process then include acicular particles at least 3 in average axial ratio with respect to their shape as primary particles and composed substantially of iron carbide alone or iron carbide and iron oxide and/or elemental carbon.

The iron carbide and iron oxide contents of the acicular particles obtained by the present process can be determined from the chemical formulae $Fe_5C_2$ and $Fe_3O_4$, which are confirmed as the main iron carbide and iron oxide components by X-ray diffraction analysis, the result of elementary analysis and the weight gain on ignition. The iron carbide content is preferably at least 20 wt%, more preferably at least 50 wt%. The iron oxide content is preferably up to 70 wt%, more preferably up to 40 wt%.

In the invention, the iron carbide contains $Fe_5C_2$ as a main component and contains preferably about 80 to 100% by weight of $Fe_5C_2$.

The acicular particles obtained by the present process are slightly smaller than but almost the same as the starting particles, namely acicular iron oxyhydroxide or acicular iron oxide, in average axial ratio and average particle size. Accordingly the acicular particles prepared by the present process have an average axial ratio usually of at least 3, preferably 3 to 20, and an average particle size (long axis) usually of up to 2 μm, preferably 0.1 to 2 μm, most preferably 0.1 to 1.0 μm.

The acicular particles of the present invention containing iron carbide are useful as a magnetic material for magnetic recording as is apparent from the foregoing characteristics, etc., while the use thereof is not limited thereto. For example, the acicular particulate material is usable as a catalyst for preparing lower aliphatic hydrocarbons from CO and $H_2$.

In the present invention, it is possible to reduce the amount of CO by contacting acicular iron oxyhydroxide or acicular iron oxide with the reducing agent containing no carbon in the process (a). Further, when the contact in (a) is not conducted, it is possible to conduct the reaction without or with use of CO in a reduced amount by employing the reducing-and-carbonizing agent containing carbon atom other than CO.

In case the contact in (a) is not conducted, it is possible to reduce the amount of the reducing-and-carbonizing agent containing carbon atom by the reduction using the reducing agent containing no carbon. Thus, the amount of carbon formed is reduced.

The invention will be described below in detail with reference to examples.

In the following examples, characteristics, etc. are determined in the methods described below.

(1) Magnetic characteristics.

Determined in the following method unless otherwise specified.

Coercive force Hc, saturation magnetization ($\sigma s$, e.m.u.) and remanent magnetization ($\sigma r$, e.m.u.) are measured in a magnetic field with a strength of 5 kOe, using a gauss meter equipped with a Hall-effect element and the sample with a packing ratio of 0.2.

(2) Elementary analysis for C, H and N

The sample is subjected to elementary analysis in the conventional method using MT2 CHN CORDER Yanaco, product of Yanagimoto Mfg. Co., Ltd, with passage of oxygen (helium carrier) at 900° C.

(3) Determination of composition

The composition of the product is calculated from the chemical formulae of iron oxide and iron carbide determined by X-ray diffractiometry, the elementary analysis value of C and the weight gain resulting from the following heat treatment. The calculation is conducted on the basis that $Fe_3O_4$, for example, changes into $Fe_2O_3$ having 1.035 times the weight of the former oxide and that $Fe_5C_2$ changes into $Fe_2O_3$ having 1.317 times the weight of the carbide. The weight gain is determined in the conventional method of heat treatment, i.e. by placing the sample in a platinum crucible, then heating the sample in a muffle furnace at 600° C. for 1 hour in the air and measuring the resulting weight gain after ascertaining the presence of $\alpha$-$Fe_2O_3$ by X-ray diffraction.

Stated more specifically, it is assumed that the proportions of $Fe_5C_2$, $Fe_3O_4$ and elemental carbon are x, y and z wt%, respectively, and that the carbon analysis value and the weight gain are A and B wt%, respectively. The values x, y and z are then given by the following equations.

$$x+y+z=100$$

$$1.317x+1.035y=100+B$$

$$z+0.079x=A$$

The followings are properties or production history of the starting iron compound used in Examples.

$\gamma$-FeOOH surface pH 6.5

$\alpha$-FeOOH surface pH 8.0

$\gamma$-$Fe_2O_3$ prepared by heating lepidocrosite in a muffle furnace at 250° C. for 1 hour $\alpha$-$Fe_2O_3$ (1) prepared by heating goethite in a muffle furnace at 600° C. for 1 hour $\alpha$-$Fe_2O_3$ (2) prepared by heating lepidocrosite in a muffle furnace at 600° C. for 1 hour

EXAMPLE 1

Two grams of acicular goethite particles, 0.6 μm in average size (long axis) and 10 in average axial ratio, were placed into a porcelain boat, which was then inserted into a tubular furnace. After replacing the air in the furnace by nitrogen, the particles were heated to 300° C. and kept at this temperature for 1 hour while passing $H_2$ through the furnace at a flow rate of 1000 ml/min. The particles were subsequently heated to 350° C. under a stream of nitrogen and kept at this temperature for 1 hour while passing CO through the furnace at a flow rate of 1000 ml/min. The particles were thereafter allowed to cool to room temperature to obtain an acicular black powder.

The X-ray diffraction pattern of the product matched that of $Fe_5C_2$ Iron Carbide on ASTM X-Ray Powder Data File 20-509. Table 2 shows the magnetic characteristics and compositions of the products.

EXAMPLES 2 TO 17 AND REFERENCE EXAMPLE 1

A black powder was prepared in the same manner as in Example 1 with use of the starting material and contact conditions listed in Table 1. The results were given in Tables 1 and 2.

TABLE 1

| | Starting material | | | Gas contacted | | Contact | Contact |
|---|---|---|---|---|---|---|---|
| Ex. | kind | particle size (μm) | axial ratio | kind | flow rate (ml/min) | temp (°C.) | time (hr) |
| 1 | $\alpha$-FeOOH | 0.6 | 10 | $H_2$ | 100 | 300 | 1 |
| | | | | CO | 100 | 350 | 1 |
| 2 | $\alpha$-FeOOH | 0.6 | 10 | $H_2$ | 100 | 300 | 1 |
| | | | | CO | 100 | 400 | 0.5 |
| 3 | $\alpha$-FeOOH | 0.6 | 10 | $H_2$ | 100 | 300 | 1 |
| | | | | $CH_4$ | 100 | 350 | 1 |
| 4 | $\alpha$-FeOOH | 0.6 | 10 | $H_2$ | 100 | 300 | 1 |
| | | | | $C_3H_8$ | 100 | 300 | 1 |
| 5 | $\alpha$-FeOOH | 0.6 | 10 | $H_2$ | 100 | 300 | 1 |
| | | | | i-$C_4H_{10}$ | 100 | 300 | 1 |
| 6 | $\alpha$-FeOOH | 0.6 | 10 | $H_2$ | 100 | 300 | 1 |
| | | | | $CH_3OH$ | 200 | 350 | 1 |
| 7 | $\alpha$-FeOOH | 0.6 | 10 | $H_2$ | 100 | 300 | 1 |
| | | | | $C_3H_8$ | 200 | 350 | 1 |
| 8 | $\alpha$-FeOOH | 0.6 | 10 | $H_2$ | 100 | 300 | 1 |
| | | | | $CH{\equiv}CH$ | 100 | 300 | 1 |
| 9 | $\alpha$-FeOOH | 0.6 | 10 | $H_2$ | 100 | 300 | 1 |
| | | | | isoprene | 100 | 350 | 1 |
| 10 | $\alpha$-FeOOH | 0.6 | 10 | $H_2$ | 100 | 300 | 1 |
| | | | | $C_6H_6$ | 100 | 350 | 1 |

TABLE 1-continued

| | Starting material | | Gas contacted | | Contact temp (°C.) | Contact time (hr) |
|---|---|---|---|---|---|---|
| Ex. | kind | particle size (μm) | axial ratio | kind | flow rate (ml/min) | |
| 11 | α-FeOOH | 0.6 | 10 | H$_2$ | 100 | 300 | 1 |
| | | | | diethyl ether | 100 | 350 | 1 |
| 12 | α-FeOOH | 0.6 | 10 | H$_2$ | 100 | 300 | 1 |
| | | | | vinyl methyl ether | 100 | 350 | 1 |
| 13 | α-FeOOH | 0.6 | 10 | H$_2$ | 100 | 300 | 1 |
| | | | | C$_3$H$_8$/CH$_3$OH (1/1) | 100 | 300 | 2 |
| 14 | γ-Fe$_2$O$_3$ | 0.4 | 12 | H$_2$ | 200 | 350 | 1.5 |
| | | | | C$_3$H$_8$ | 100 | 350 | 1 |
| 15 | γ-Fe$_2$O$_3$ | 0.4 | 12 | H$_2$ | 200 | 350 | 1.5 |
| | | | | CH$_2$=CH$_2$ | 100 | 350 | 1 |
| 16 | γ-Fe$_2$O$_3$ | 0.4 | 12 | H$_2$ | 100 | 350 | 1.5 |
| | | | | CH$_3$OH | 300 | 350 | 1.5 |
| 17 | γ-Fe$_2$O$_3$ | 0.4 | 12 | H$_2$ | 200 | 350 | 1.5 |
| | | | | i-C$_3$H$_7$OH | 300 | 350 | 1.5 |
| Ref. Ex. 1 | γ-Fe$_2$O$_3$ | 0.4 | 12 | H$_2$ | 200 | 350 | 1.5 |

TABLE 2

| | Product | | | | | | Composition (wt %) | | |
|---|---|---|---|---|---|---|---|---|---|
| Ex. | particle size (μm) | axial ratio | Hc | σs | στ | στ/σs | Fe$_3$O$_4$ | Fe$_5$C$_2$ | C |
| 1 | 0.5 | 8 | 865 | 74.6 | 43.3 | 0.58 | 0 | 87 | 13 |
| 2 | 0.5 | 9 | 795 | 76.5 | 45.2 | 0.59 | 0 | 80 | 20 |
| 3 | 0.5 | 9 | 930 | 77.5 | 47.2 | 0.61 | 0 | 95 | 5 |
| 4 | 0.5 | 9 | 940 | 78.5 | 48.6 | 0.62 | 0 | 96 | 4 |
| 5 | 0.5 | 9 | 945 | 78.3 | 46.5 | 0.59 | 0 | 97 | 3 |
| 6 | 0.5 | 7 | 935 | 77.7 | 46.3 | 0.59 | 3 | 95 | 2 |
| 7 | 0.5 | 7 | 920 | 78.1 | 46.5 | 0.59 | 4 | 92 | 4 |
| 8 | 0.5 | 7 | 890 | 74.2 | 47.4 | 0.64 | 0 | 90 | 10 |
| 9 | 0.5 | 7 | 895 | 75.3 | 41.2 | 0.55 | 0 | 92 | 8 |
| 10 | 0.5 | 7 | 905 | 78.7 | 47.6 | 0.60 | 0 | 93 | 7 |
| 11 | 0.5 | 8 | 885 | 77.4 | 47.2 | 0.61 | 3 | 90 | 7 |
| 12 | 0.5 | 8 | 910 | 74.9 | 48.7 | 0.65 | 2 | 93 | 5 |
| 13 | 0.5 | 8 | 900 | 76.3 | 46.1 | 0.60 | 3 | 92 | 5 |
| 14 | 0.3 | 10 | 925 | 78.7 | 48.7 | 0.62 | 3 | 95 | 2 |
| 15 | 0.3 | 10 | 880 | 77.1 | 47.4 | 0.61 | 5 | 90 | 5 |
| 16 | 0.3 | 9 | 820 | 76.9 | 44.4 | 0.58 | 12 | 85 | 3 |
| 17 | 0.3 | 11 | 795 | 73.1 | 45.6 | 0.62 | 15 | 82 | 3 |
| Ref. Ex. 1 | 0.3 | 11 | 1153 | 121.5 | 73.3 | 0.60 | 5 | Fe:95 | |

EXAMPLE 18

Two grams of acicular goethite particles, 0.6 μm in average size (long axis) and 10 in average axial ratio, were placed into a porcelain boat, which was then inserted into a tubular furnace. After replacing the air in the furnace by nitrogen, the particles were heated to 350° C. and kept at this temperature for 3.5 hours while pasing CH$_3$OH through the furnace at a flow rate of 500 ml/min. The particles were thereafter allowed to cool to room temperature to obtain an acicular black powder.

The X-ray diffraction pattern of the product matched that of Fe$_5$C$_2$ Iron Carbide on ASTM X-Ray Powder Data File 20-509. Table 4 shows the magnetic characteristics and compositions of the products.

EXAMPLES 19 TO 29

A black powder was prepared in the same manner as in Example 18 with use of the starting material and contact conditions listed in Table 3. The results were given in Tables 3 and 4. γ-Fe$_2$O$_3$ in Example 22 was obtained by treating α-FeOOH with silane compound, and dehydrating the treated compound at 200° C. after drying.

TABLE 3

| | Starting material | | | Gas contacted | | Contact temp (°C.) | Contact time (hr) |
|---|---|---|---|---|---|---|---|
| Ex. | kind | particle size (μm) | axial ratio | kind | flow rate (ml/min) | | |
| 18 | α-FeOOH | 0.6 | 10 | CH$_3$OH | 500 | 350 | 3.5 |
| 19 | α-FeOOH | 0.6 | 10 | CH$_3$OH | 500 | 360 | 3.0 |
| 20 | γ-FeOOH | 0.7 | 9 | CH$_3$OH | 450 | 350 | 3.0 |
| 21 | β-FeOOH | 0.5 | 10 | CH$_3$OH | 380 | 330 | 3.5 |
| 22 | γ-Fe$_2$O$_3$ | 0.3 | 10 | CH$_3$OH | 350 | 350 | 5.0 |
| 23 | α-FeOOH | 0.6 | 10 | CH$_3$OH/CO (1/1) | 500 | 350 | 3.0 |
| 24 | α-FeOOH | 0.6 | 10 | CH$_3$OH/H$_2$ (1/1) | 500 | 350 | 3.0 |
| 25 | α-FeOOH | 0.6 | 10 | CH$_4$/H$_2$ (1/3) | 500 | 350 | 3.0 |
| 26 | α-FeOOH | 0.6 | 10 | C$_3$H$_8$/H$_2$ | 500 | 350 | 3.0 |

TABLE 3-continued

| | Starting material | | | Gas contacted | | Contact temp (°C.) | Contact time (hr) |
|---|---|---|---|---|---|---|---|
| Ex. | kind | particle size (μm) | axial ratio | kind | flow rate (ml/min) | | |
| 27 | α-Fe$_2$O$_3$ (1) | 0.4 | 8 | (1/3) CH$_3$OH | 500 | 350 | 3.0 |
| 28 | α-Fe$_2$O$_3$ (2) | 0.4 | 8 | CH$_3$OH | 500 | 350 | 3.0 |
| 29 | α-FeOOH | 0.6 | 10 | HCOOCH$_3$ | 500 | 350 | 3.0 |

TABLE 4

| | Product | | | | | | Composition (wt %) | | |
|---|---|---|---|---|---|---|---|---|---|
| Ex. | particle size (μm) | axial ratio | Hc | σs | στ | στ/σs | Fe$_3$O$_4$ | Fe$_5$C$_2$ | C |
| 18 | 0.5 | 9 | 840 | 77.6 | 41.3 | 0.532 | 3 | 85 | 12 |
| 19 | 0.5 | 9 | 875 | 78.1 | 42.2 | 0.540 | 3 | 87 | 10 |
| 20 | 0.6 | 8 | 850 | 77.8 | 43.2 | 0.555 | 5 | 83 | 12 |
| 21 | 0.4 | 9 | 875 | 81.0 | 47.1 | 0.581 | 6 | 81 | 13 |
| 22 | 0.3 | 9 | 773 | 76.5 | 43.2 | 0.565 | 23 | 62 | 15 |
| 23 | 0.5 | 9 | 785 | 81.2 | 45.6 | 0.562 | 4 | 78 | 18 |
| 24 | 0.5 | 9 | 885 | 79.2 | 45.6 | 0.576 | 4 | 87 | 9 |
| 25 | 0.5 | 9 | 671 | 77.4 | 40.3 | 0.521 | 18 | 74 | 8 |
| 26 | 0.5 | 9 | 658 | 77.8 | 42.6 | 0.548 | 15 | 75 | 10 |
| 27 | 0.4 | 8 | 635 | 74.5 | 40.9 | 0.549 | 30 | 63 | 7 |
| 28 | 0.4 | 8 | 720 | 72.6 | 41.6 | 0.573 | 24 | 71 | 5 |
| 29 | 0.5 | 9 | 860 | 77.3 | 43.8 | 0.567 | 5 | 84 | 11 |

What is claimed is:

1. A process for producing high coercive force, magnetic acicular particles containing an iron carbide a main component of which is Fe$_5$C$_2$ which comprises,
    (a) optionally contacting an acicular iron compound having a surface pH of at least 5 and selected from the group consisting of an acicular iron oxyhydroxide and acicular iron oxide with a reducing agent which does not contain carbon atoms and selected from the group consisting of H$_2$ and NH$_2$NH$_2$ at a temperature of 200° to 700° C., and
    (b) contacting the iron compound of the above (a) with a reducing-and-carbonizing agent containing carbon atoms or a mixture thereof with H$_2$ or NH$_2$NH$_2$ at a temperature of 250° to 400° C.; provided that CO is excluded from the reducing-and-carbonizing agent of (b) when the contact in (a) is not conducted.

2. A process as defined in claim 1 wherein the iron compound is α-FeOOH, β-FeOOH, γ-FeOOH, α-Fe$_2$O$_3$ or γ-Fe$_2$O$_3$.

3. A process as defined in claim 2 wherein the reducing agent is H$_2$.

4. A process as defined in claim 2 wherein the reducing agent is H$_2$, and the reducing-and-carbonizing agent is CO or a mixture of CO and H$_2$.

5. A process as defined in claim 1 wherein the contact in (a) is not conducted, and the contact in (b) is conducted at 250 at 400° C.

6. Process of claim 5, wherein the step (b) is conducted at a contact time of about 1 to about 12 hours.

7. A process as defined in claim 1 wherein the reducing-and-carbonizing agent is CH$_3$OH, HCOOCH$_3$, or saturated or unsaturated aliphatic hydrocarbon having 1 to 5 carbon atoms.

8. A process as defined in claim 1 wherein the reducing agent is H$_2$, and the reducing-and-carbonizing agent is CH$_3$OH, HCOOCH$_3$, or saturated or unsaturated aliphatic hydrocarbon having 1 to 5 carbon atoms.

9. Process of claim 1, wherein the reducing-and-carbonizing agent is selected from the group consisting of carbon monoxide, aliphatic, linear or cyclic, saturated or unsaturated hydrocarbons, aromatic hydrocarbons, alkylated and alkenylated derivatives thereof having a boiling point up to 150° C., aliphatic alcohols, esters having a boiling point up to 150° C., aldehydes having a boiling point up to 150° C., and ketones having a boiling point up to 150° C.

10. Process of claim 1, wherein the reducing-and-carbonizing agent is selected from the group consisting of CO, methane, propane, butane, cyclohexane, methylcyclohexane, acetylene, ethylene, propylene, butadiene, isoprene, town gas, benzene, toluene, xylene, methanol, ethanol, propanol, cyclohexanol, methyl formate, ethyl acetate, lower alkyl ether, vinyl ether, formaldehyde, acetaldehyde, acetone, methyl ethyl ketone, and methyl isobutyl ketone.

11. Process of claim 1, wherein the step (a) is conducted for a contact time of about 0.5 to about 6 hours.

12. Process of claim 11, wherein the step (b) is conducted for a contact time of about 0.5 to about 6 hours.

13. Process of claim 1, wherein step (a) is conducted at a contact temperature of about 300° to about 400° C.

14. Process of claim 1, wherein step (b) is conducted at a contact temperature of about 300° to about 400° C.

* * * * *